US011272493B2

United States Patent
(12) United States Patent
Yang et al.

(10) Patent No.: US 11,272,493 B2
(45) Date of Patent: Mar. 8, 2022

(54) POWER INDICATION METHOD, NETWORK DEVICE, TERMINAL DEVICE AND COMPUTER STORAGE MEDIUM

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 124 days.

(21) Appl. No.: 16/652,197

(22) PCT Filed: Oct. 11, 2017

(86) PCT No.: PCT/CN2017/105650
§ 371 (c)(1),
(2) Date: Mar. 30, 2020

(87) PCT Pub. No.: WO2019/071459
PCT Pub. Date: Apr. 18, 2019

(65) Prior Publication Data
US 2020/0252913 A1 Aug. 6, 2020

(51) Int. Cl.
*H04W 72/04* (2009.01)
*H04W 72/12* (2009.01)

(52) U.S. Cl.
CPC ..... *H04W 72/042* (2013.01); *H04W 72/1205* (2013.01); *H04W 72/1289* (2013.01)

(58) Field of Classification Search
CPC ........... H04W 72/042; H04W 72/1205; H04W 72/1289
(Continued)

(56) References Cited

U.S. PATENT DOCUMENTS 7,453,845 B2 * 11/2008 Cha ...................... H04L 47/822 370/329
8,867,442 B2 * 10/2014 Pelletier ................ H04L 5/0005 370/328
(Continued)

FOREIGN PATENT DOCUMENTS

CN 101841843 9/2010
CN 106162851 11/2016
(Continued)

OTHER PUBLICATIONS

3GPP Technical Specification Group Radio Access Network, "3rd Generation Partnership Project; Technical Specification Group Radio Access Network; Evolved Universal Terrestrial Radio Access (E-UTRA); Physical layer procedures (Release 14)," 3GPP TS 36.213 v14.4.0, Sep. 2017, 462 pages.
(Continued)

*Primary Examiner* — Peter G Solinsky
(74) *Attorney, Agent, or Firm* — Hodgson Russ LLP

(57) ABSTRACT

Disclosed by the present invention are a power indication method, a network device, a terminal device and a computer storage medium, the method comprising: in downlink data scheduling information, indicating to a terminal device second power allocation information for a downlink data channel.

10 Claims, 3 Drawing Sheets

201
Indicate first power allocation information of a downlink data channel to the terminal device through a radio resource control RRC signaling 202
In the downlink data scheduling information, indicate second power allocation information for all the downlink data channels to the terminal device; and indicate the terminal device to maintain to use a power corresponding the second power allocation information to receive all downlink data until new power allocation information is received

(58) Field of Classification Search
USPC .......................................................... 370/329
See application file for complete search history.

(56) References Cited

U.S. PATENT DOCUMENTS

| | | | | |
|---|---|---|---|---|
| 10,419,172 | B2 * | 9/2019 | Kim | H04L 5/006 |
| 2013/0157709 | A1 * | 6/2013 | Ji | H04W 52/143<br>455/522 |
| 2017/0034795 | A1 | 2/2017 | Madan | |
| 2019/0053313 | A1 * | 2/2019 | Zhou | H04W 52/146 |

FOREIGN PATENT DOCUMENTS

| | | |
|---|---|---|
| WO | 2013051865 | 4/2013 |
| WO | 2013066053 | 5/2013 |
| WO | 2013070166 | 5/2013 |
| WO | 2015131381 | 9/2015 |
| WO | 2017040788 | 3/2017 |
| WO | 2017086868 | 5/2017 |
| WO | 2017164917 | 9/2017 |

OTHER PUBLICATIONS

WIPO, ISR for PCT/CN2017/105650, Jul. 2, 2018.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 v13.0.0, Jun. 2015, 254 pages.

EPO, Office Action for EP Application No. 17928517.6, dated Aug. 10, 2020.

KIPO, Office Action for KR Application No. 10-2020-7012538, dated May 10, 2021.

IPI, Office Action for IN Application No. 202017018577, dated Jun. 14, 2021.

EPO, Extended European Search Report for EP Application No. 18930174.0, dated Jul. 26, 2021.

InterDigital Inc., "C-DRX with Multiple Configurations," 3GPP TSG-RAN WG2 NR AH#2, R2-1706683, Jun. 2017, 5 pages.

Huawei et al., "Down-selection of DRX mechanism in sTTI," 3GPP TSG-RAN WG2 Meeting #99, R2-1708565, Aug. 2017, 4 pages.

Oppo et al., "UE behaviour on DRX timer operation," 3GPP TSG-RAN2 #101, R2-1801763, Feb. 2018, 7 pages.

* cited by examiner

POWER INDICATION METHOD, NETWORK DEVICE, TERMINAL DEVICE AND COMPUTER STORAGE MEDIUM

CROSS-REFERENCE TO RELATED APPLICATION

This application is a U.S. national phase application of International Application No. PCT/CN2017/105650, filed Oct. 11, 2017, the entire disclosure of which is incorporated herein by reference.

TECHNICAL FIELD

The present disclosure relates to the field of information transmission technologies, and in particular, to a power indication method, a network device, a terminal device, and a computer storage medium.

BACKGROUND

At present, with the pursuit of speed, delay, high-speed mobility, energy efficiency and the diversity and complexity of services in the future, the 3GPP International Standards Organization has begun to develop 5G. In order to support LTE-NR interworking in 5G, different band combinations between RATs have emerged to support LTE-NR DC transmission data and improve system throughput.

SUMMARY

An embodiment of the present invention provides a power indication method, a network device, a terminal device, and a computer storage medium.

An embodiment of the present disclosure provides a power indication method, being applied to a network device. The method includes:

indicating second power allocation information for a downlink data channel to a terminal device in downlink data scheduling information.

In the solution, before the indicating second power allocation information for a downlink data channel to a terminal device in downlink data scheduling information, the method further includes:

indicating first power allocation information of a downlink data channel to the terminal device through a radio resource control RRC signaling.

In the solution, the indicating second power allocation information for a downlink data channel to a terminal device in downlink data scheduling information includes:

in the downlink data scheduling information, indicating the terminal device to use the second power allocation information for the downlink data channel only for currently scheduled data transmission; and maintaining the first power allocation information to be used for the downlink data channel for other downlink data transmission than the currently scheduled downlink data transmission.

In the solution, the indicating second power allocation information for a downlink data channel to a terminal device in downlink data scheduling information includes: in the downlink data scheduling information, indicating second power allocation information for all the downlink data channels to the terminal device; and indicating the terminal device to maintain to use a power corresponding the second power allocation information to receive all downlink data until new power allocation information is received.

In the solution, the method further includes:

transmitting the new power allocation information to the terminal device through DCI or RRC reconfiguration information.

An embodiment of the present disclosure provides a power indication method, being applied to a terminal device. The method includes:

receiving downlink data scheduling information transmitted from a network side; and acquiring second power allocation information for a downlink data channel from the downlink data scheduling information.

In the solution, the method further includes:

receiving first power allocation information of a downlink data channel indicated from the network side through a radio resource control RRC signaling.

In the solution, the acquiring second power allocation information for a downlink data channel from the downlink data scheduling information includes:

in the downlink data scheduling information, acquiring second power allocation information for the downlink data channel only for currently scheduled data transmission, to receive the downlink data channel of the currently scheduled data transmission with a power indicated in the second power allocation information; and maintaining to use a power indicated in the first power allocation information for receiving other downlink data than the currently scheduled downlink data.

In the solution, the acquiring second power allocation information for a downlink data channel from the downlink data scheduling information includes:

in the downlink data scheduling information, acquiring second power allocation information for all the downlink data channels; and using a power corresponding the second power allocation information to receive all downlink data until new power allocation information is received.

In the solution, the method further includes:

receiving the new power allocation information transmitted from the network side through DCI or RRC reconfiguration information.

An embodiment of the present disclosure also provides a network device, including:

a first processing unit configured to indicate second power allocation information for a downlink data channel to a terminal device in downlink data scheduling information.

In the solution, the network device further includes:

a first communication unit configured to, before second power allocation information for a downlink data channel to a terminal device is indicated in downlink data scheduling information, indicate first power allocation information of a downlink data channel to the terminal device through a radio resource control RRC signaling.

In the solution, the first processing unit is configured to, in the downlink data scheduling information, indicate the terminal device to use the second power allocation information for the downlink data channel only for currently scheduled data transmission and maintain the first power allocation information to be used for the downlink data channel for other downlink data transmission than the currently scheduled downlink data transmission.

In the solution, the first processing unit is configured to, in the downlink data scheduling information, indicate second power allocation information for all the downlink data channels to the terminal device, and indicate the terminal device to maintain to use a power corresponding the second power allocation information to receive all the downlink data until new power allocation information is received.

In the solution, the first communication unit is configured to transmit the new power allocation information to the terminal device through DCI or RRC reconfiguration information.

An embodiment of the present disclosure also provides a terminal device including:

a second communication unit configured to receive downlink data scheduling information transmitted from a network side; and a second processing unit configured to acquire second power allocation information for a downlink data channel from the downlink data scheduling information.

In the solution, the second communication unit is configured to receive first power allocation information of a downlink data channel indicated from the network side through a radio resource control RRC signaling.

In the solution, the second processing unit is configured to, in the downlink data scheduling information, acquire second power allocation information for the downlink data channel only for currently scheduled data transmission, to receive the downlink data channel of the currently scheduled data transmission with a power indicated in the second power allocation information; and maintain to use a power indicated in the first power allocation information for receiving other downlink data than the currently scheduled downlink data.

In the solution, the second processing unit is configured to, in the downlink data scheduling information, acquire second power allocation information for all the downlink data channels; and use a power corresponding the second power allocation information to receive all the downlink data until new power allocation information is received.

In the solution, the second communication unit is configured to receive the new power allocation information transmitted from the network side through DCI or RRC reconfiguration information.

An embodiment of the present disclosure also provides a network device, including: a processor and a memory for storing a computer program executable on the processor, wherein when executing the computer program, the processor is operative to perform the steps of the method according to the method described above.

An embodiment of the present disclosure also provides a terminal device, including: a processor and a memory for storing a computer program executable on the processor, wherein when executing the computer program, the processor is operative to perform the steps of the method described above.

An embodiment of the present disclosure also provides a computer storage medium storing computer executable instructions that, when being executed, implement steps of the method described above.

DETAILED DESCRIPTION

In order to understand the features and technical contents of the embodiments of the present invention in more detail, implementation of the embodiments of the present disclosure are described in detail below with reference to the accompanying drawings. The accompanying drawings are for illustrative purposes only and are not intended to limit the embodiments of the present disclosure.

Embodiment 1

The embodiment of the present disclosure provides a power indication method, which is applied to a network device, and includes the following.

In downlink data scheduling information, second power allocation information for a downlink data channel is indicated to a terminal device.

It should be understood that, typically, the power of the channel for downlink data transmission is semi-statically configured to the UE through RRC signaling. Then, the UE needs to demodulate the downlink data according to the power of the data transmission channel.

While in the solution provided in the embodiment of the present disclosure, in order to overcome the deterioration of the data demodulation performance caused by the self-interference problem, the power of the downlink data transmission channel is dynamically changed, that is, power allocation information of the downlink data channel is indicated in the downlink data scheduling information, so as to improve the downlink data demodulation performance. Dynamically configuring the downlink data power allocation information may have the following two implementations.

Figure 1:
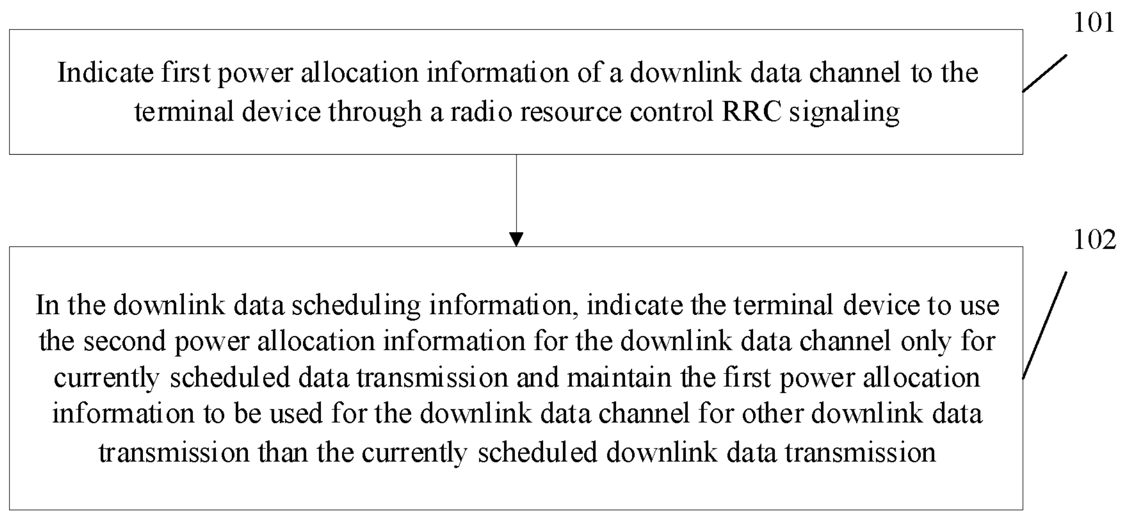
FIG. 1 is a schematic flowchart 1 of a power indication method according to an embodiment of the present disclosure.

Implementation 1 includes the following steps, as shown in FIG. 1.

At step 101, through a radio resource control RRC signaling, first power allocation information of a downlink data channel is indicated to the terminal device.

At step 102, in the downlink data scheduling information, the terminal device is indicated to use the second power allocation information for the downlink data channel only for currently scheduled data transmission and the first power allocation information is maintained to be used for the downlink data channel for other downlink data transmission than the currently scheduled downlink data transmission.

That is to say, the power allocation information of the downlink data channel in the downlink data scheduling information is only used for the downlink channel power configuration of the currently scheduled data transmission. The power configuration of other downlink data reception is still calculated according to the power allocation information of the downlink data channel configured by the RRC signaling.

Figure 2:
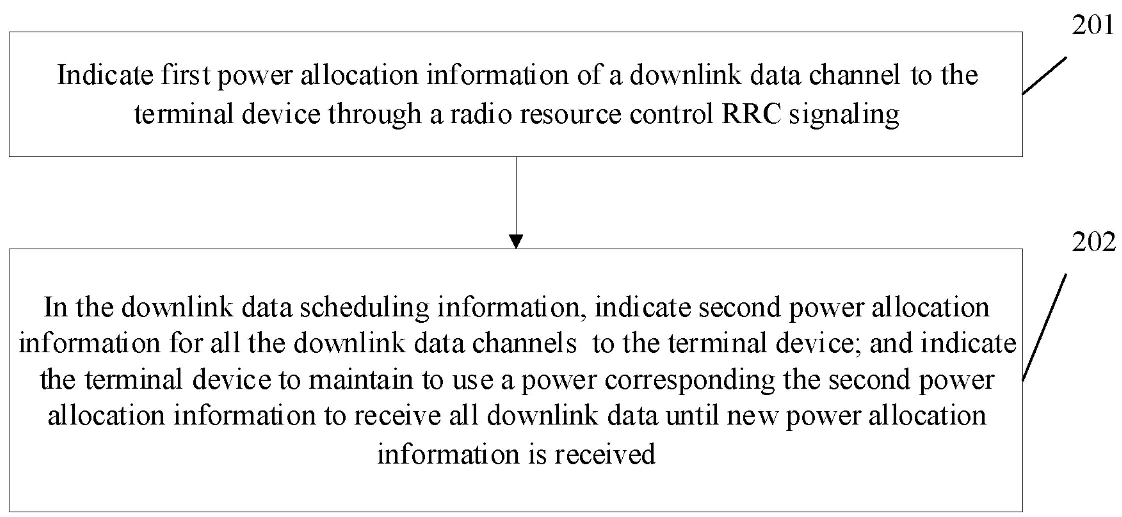
FIG. 2 is a schematic flowchart 2 of a power indication method according to an embodiment of the present disclosure.

Implementation 2 includes the following steps, as shown in FIG. 2.

At step 201, through a radio resource control RRC signaling, first power allocation information of a downlink data channel is indicated to the terminal device.

At step 202: in the downlink data scheduling information, second power allocation information for all the downlink data channels is indicated to the terminal device, and the terminal device is indicated to maintain to use a power corresponding the second power allocation information to receive all the downlink data until new power allocation information is received.

Further, in the above step 202, transmitting new power allocation information to the terminal device may be performed in the following manner.

The new power allocation information is transmitted to the terminal device through DCI or RRC reconfiguration information.

The power allocation information of the downlink data channel in the downlink data scheduling information overwrites the power allocation information of the downlink data channel configured by the RRC signaling. That is, after the power allocation information of the downlink data channel in the downlink data scheduling information is received, the power allocation information is kept valid until power allocation information of the downlink data channel in new downlink data scheduling information reconfigured by the DCI or RRC is received.

It can be seen that, by adopting the above solution, the power information to be used for the current downlink data channel can be more flexibly indicated to the terminal device through the downlink data scheduling information, so that the terminal device can at least temporarily adjust the reception power for currently receiving the downlink data channel. In this way, the downlink data demodulation performance can be improved by dynamically changing the power of the downlink data channel.

Embodiment 2

Figure 3:
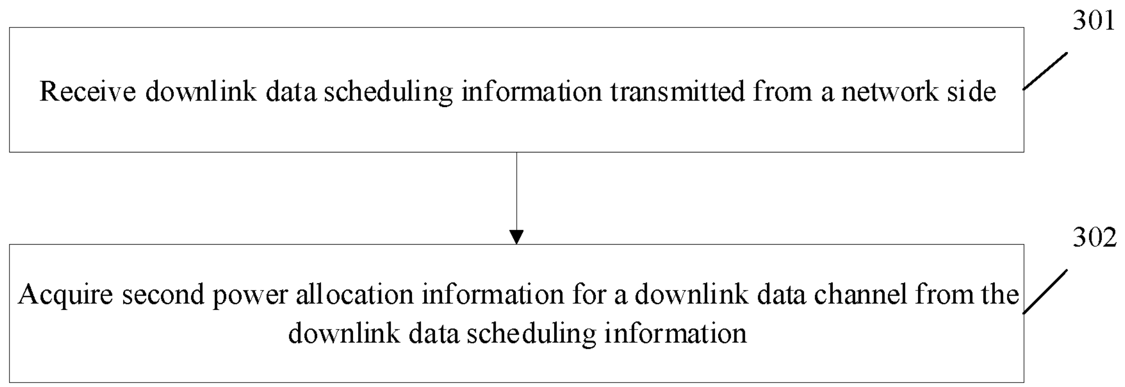
FIG. 3 is a schematic flowchart 3 of a power indication method according to an embodiment of the present disclosure.

The embodiment of the present disclosure provides a power indication method, which is applied to a terminal device. As shown in FIG. 3, the method includes the following steps.

At step 301, downlink data scheduling information transmitted from the network side is received.

At step 302, second power allocation information for a downlink data channel is acquired from the downlink data scheduling information.

It should be understood that, typically, the power of the channel for downlink data transmission is semi-statically configured to the UE through RRC signaling. Then, the UE needs to demodulate the downlink data according to the power of the data transmission channel.

While in the solution provided in the embodiment of the present disclosure, in order to overcome the deterioration of the data demodulation performance caused by the self-interference problem, the power of the downlink data transmission channel is dynamically changed, that is, power allocation information of the downlink data channel is indicated in the downlink data scheduling information, so as to improve the downlink data demodulation performance. Dynamically configuring the downlink data power allocation information may have the following two implementations.

In implementation 1, through a radio resource control RRC signaling, first power allocation information of a downlink data channel indicated from the network side is received. In the downlink data scheduling information, second power allocation information for the downlink data channel only for currently scheduled data transmission is acquired, to receive the downlink data channel of the currently scheduled data transmission with a power indicated in the second power allocation information, and a power indicated in the first power allocation information is maintained to be used for receiving other downlink data than the currently scheduled downlink data.

Both of the first power allocation information and the second power allocation information can at least indicate the receiving power. In addition, the first power allocation information is different from the second power allocation information.

That is to say, the power allocation information of the downlink data channel in the downlink data scheduling information is only used for the downlink channel power configuration of the currently scheduled data transmission. The power configuration of other downlink data reception is still calculated according to the power allocation information of the downlink data channel configured by the RRC signaling.

In implementation 2, through a radio resource control RRC signaling, first power allocation information of a downlink data channel is indicated to the terminal device. In the downlink data scheduling information, second power allocation information for all the downlink data channels is acquired, and a power corresponding the second power allocation information is used to receive all the downlink data until new power allocation information is received.

Further, the new power allocation information transmitted from the network side is received through DCI or RRC reconfiguration information.

The power allocation information of the downlink data channel in the downlink data scheduling information overwrites the power allocation information of the downlink data channel configured by the RRC signaling. That is, after the power allocation information of the downlink data channel in the downlink data scheduling information is received, the power allocation information is kept valid until power allocation information of the downlink data channel in new downlink data scheduling information reconfigured by the DCI or RRC is received.

It can be seen that, by adopting the above solution, the power information to be used for the current downlink data channel can be more flexibly indicated to the terminal device through the downlink data scheduling information, so that the terminal device can at least temporarily adjust the reception power for currently receiving the downlink data channel. In this way, the downlink data demodulation performance can be improved by dynamically changing the power of the downlink data channel.

Embodiment 3

Figure 4:
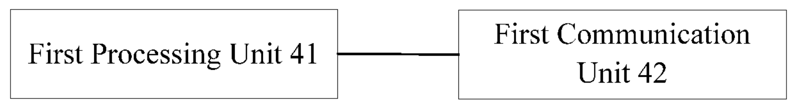
FIG. 4 is a schematic block diagram of a network device according to an embodiment of the present disclosure.

The embodiment of the present disclosure provides a network device. As shown in FIG. 4, the network device includes:

- a first processing unit 41 configured to, in downlink data scheduling information, indicate second power allocation information for a downlink data channel to a terminal device.

It should be understood that, typically, the power of the channel for downlink data transmission is semi-statically configured to the UE through RRC signaling. Then, the UE needs to demodulate the downlink data according to the power of the data transmission channel.

While in the solution provided in the embodiment of the present disclosure, in order to overcome the deterioration of the data demodulation performance caused by the self-interference problem, the power of the downlink data transmission channel is dynamically changed, that is, power allocation information of the downlink data channel is indicated in the downlink data scheduling information, so as to improve the downlink data demodulation performance. Dynamically configuring the downlink data power allocation information may have the following two implementations.

In implementation 1, as shown in FIG. 4, the network device further includes:

- a first communication unit 42 configured to, through a radio resource control RRC signaling, indicate first power allocation information of a downlink data channel to the terminal device; and
- the first processing unit 41 is configured to, in the downlink data scheduling information, indicate the terminal device to use the second power allocation information for the downlink data channel only for currently scheduled data transmission and maintain the first power allocation information to be used for the downlink data channel for other downlink data transmission than the currently scheduled downlink data transmission.

That is to say, the power allocation information of the downlink data channel in the downlink data scheduling information is only used for the downlink channel power configuration of the currently scheduled data transmission. The power configuration of other downlink data reception is still calculated according to the power allocation information of the downlink data channel configured by the RRC signaling.

In implementation 2, the first communication unit 42 is configured to, through a radio resource control RRC signaling, indicate first power allocation information of a downlink data channel to the terminal device.

The first processing unit 41 is configured to, in the downlink data scheduling information, indicate second power allocation information for all the downlink data channels to the terminal device, and indicate the terminal device to use a power corresponding the second power allocation information to receive all the downlink data until new power allocation information is received.

Further, the first communication unit 42 is configured to transmit the new power allocation information to the terminal device through DCI or RRC reconfiguration information.

The power allocation information of the downlink data channel in the downlink data scheduling information overwrites the power allocation information of the downlink data channel configured by the RRC signaling. That is, after the power allocation information of the downlink data channel in the downlink data scheduling information is received, the power allocation information is kept valid until power allocation information of the downlink data channel in new downlink data scheduling information reconfigured by the DCI or RRC is received.

It can be seen that, by adopting the above solution, the power information to be used for the current downlink data channel can be more flexibly indicated to the terminal device through the downlink data scheduling information, so that the terminal device can at least temporarily adjust the reception power for currently receiving the downlink data channel. In this way, the downlink data demodulation performance can be improved by dynamically changing the power of the downlink data channel.

Embodiment 4

Figure 5:
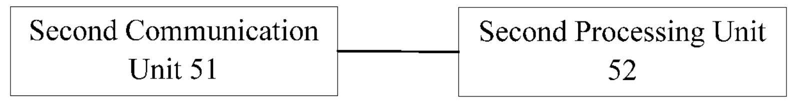
FIG. 5 is a schematic block diagram of a terminal device according to an embodiment of the present disclosure.

The embodiment of the present disclosure provides a terminal device. As shown in FIG. 5, the terminal device includes:

- a second communication unit 51 configured to receive downlink data scheduling information transmitted from the network side; and
- a second processing unit 52 configured to acquire second power allocation information for a downlink data channel from the downlink data scheduling information.

It should be understood that, typically, the power of the channel for downlink data transmission is semi-statically configured to the UE through RRC signaling. Then, the UE needs to demodulate the downlink data according to the power of the data transmission channel.

While in the solution provided in the embodiment of the present disclosure, in order to overcome the deterioration of the data demodulation performance caused by the self-interference problem, the power of the downlink data transmission channel is dynamically changed, that is, power allocation information of the downlink data channel is indicated in the downlink data scheduling information, so as to improve the downlink data demodulation performance. Dynamically configuring the downlink data power allocation information may have the following two implementations.

In implementation 1, the second communication unit 51 is configured to, through a radio resource control RRC signaling, receive first power allocation information of a downlink data channel indicated from the network side. The second processing unit 52 is configured to, in the downlink data scheduling information, acquire second power allocation information for the downlink data channel only for currently scheduled data transmission, to receive the downlink data channel of the currently scheduled data transmission with a power indicated in the second power allocation information, and maintain to use a power indicated in the first power allocation information for receiving other downlink data than the currently scheduled downlink data.

Both of the first power allocation information and the second power allocation information can at least indicate the receiving power. In addition, the first power allocation information is different from the second power allocation information.

That is to say, the power allocation information of the downlink data channel in the downlink data scheduling information is only used for the downlink channel power configuration of the currently scheduled data transmission. The power configuration of other downlink data reception is still calculated according to the power allocation information of the downlink data channel configured by the RRC signaling.

In implementation 2, the second communication unit 51 is configured to, through a radio resource control RRC signaling, indicate first power allocation information of a downlink data channel to the terminal device. The second processing unit 52 is configured to, in the downlink data scheduling information, acquire second power allocation information for all the downlink data channels, and maintain to use a power corresponding the second power allocation information to receive all the downlink data until new power allocation information is received.

Further, the new power allocation information transmitted from the network side is received through DCI or RRC reconfiguration information.

The power allocation information of the downlink data channel in the downlink data scheduling information overwrites the power allocation information of the downlink data channel configured by the RRC signaling. That is, after the power allocation information of the downlink data channel in the downlink data scheduling information is received, the power allocation information is kept valid until power allocation information of the downlink data channel in new downlink data scheduling information reconfigured by the DCI or RRC is received.

It can be seen that, by adopting the above solution, the power information to be used for the current downlink data channel can be more flexibly indicated to the terminal device through the downlink data scheduling information, so that the terminal device can at least temporarily adjust the reception power for currently receiving the downlink data channel. In this way, the downlink data demodulation performance can be improved by dynamically changing the power of the downlink data channel.

Figure 6:
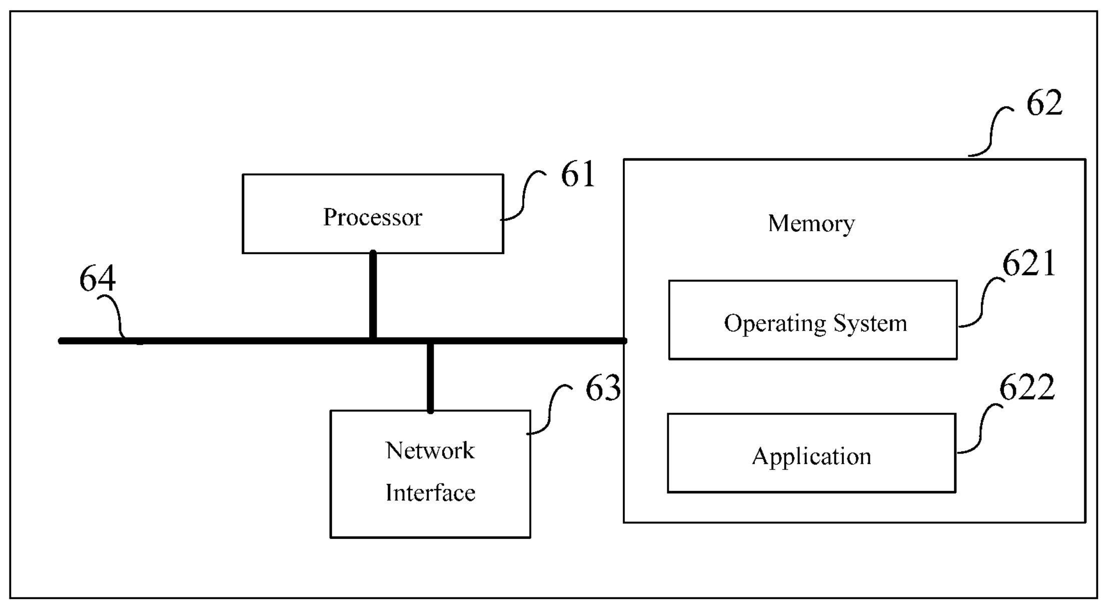
FIG. 6 is a schematic diagram of hardware architecture according to an embodiment of the present disclosure.

The embodiment of the present disclosure further provides architecture of hardware components of a terminal device, as shown in FIG. 6, including: at least one processor 61, a memory 62, and at least one network interface 63. The various components are coupled together by a bus system 64. It should be appreciated that bus system 64 is used to implement connection communication between these components. The bus system 64 includes, in addition to the data bus, a power bus, a control bus, and a status signal bus. However, for clarity of description, various buses are labeled as bus system 64 in FIG. 6.

It should be appreciated that the memory 62 in the embodiment of the present disclosure may be a volatile memory or a non-volatile memory, or may include both volatile and non-volatile memories.

In some corresponding implementations, the memory 62 stores elements, executable modules or data structures, a subset thereof, or an extended set thereof: an operating system 621 and an application 622.

The processor 61 is configured to be able to perform all the method steps described in Embodiment 1 or 2, details of which will not be described herein.

A computer storage medium is provided by the embodiment of the present disclosure. The computer storage medium stores computer executable instructions. When the computer executable instructions are executed, the method steps of the first embodiment or the second embodiment are implemented.

In the embodiments of the present disclosure, if the above device is implemented in the form of a module of software function and sold or used as a standalone product, it may also be stored in a computer readable storage medium. Based on such understanding, the technical solution of the embodiments of the present disclosure may be embodied in the form of a software product in essence or in the form of a software product stored in a storage medium, including a plurality of instructions to cause a computer device (which may be a personal computer, a server, or a network device, etc.) to perform all or part of the methods described in various embodiments of the present disclosure. The above storage medium includes various media that can store program codes, such as a USB flash drive, a mobile hard disk, a read only memory (ROM), a magnetic disk, or an optical disk. Thus, embodiments of the present disclosure are not limited to any specific combination of hardware and software.

In the technical solution of the present disclosure, the power information to be used for the current downlink data channel can be more flexibly indicated to the terminal device through the downlink data scheduling information, so that the terminal device can at least temporarily adjust the reception power for currently receiving the downlink data channel. In this way, the downlink data demodulation performance can be improved by dynamically changing the power of the downlink data channel, to reduce the self-interference problem in receiving downlink data, thereby further improving downlink data demodulation performance.

Correspondingly, an embodiment of the present disclosure further provides a computer storage medium storing a computer program, and the computer program is configured to execute a data scheduling method according to an embodiment of the present disclosure.

While the preferred embodiments of the present disclosure have been disclosed for purposes of illustration, those skilled in the art will recognize that various modifications, additions and substitutions are possible, and the scope of the present disclosure should not be limited to the embodiments described above.

What is claimed is:

1. A power indication method, being applied to a network device, and the method comprising:

indicating, in downlink data scheduling information, second power allocation information for a downlink data channel to a terminal device, wherein the indicating the second power allocation information for the downlink data channel to the terminal device comprises: in the downlink data scheduling information, indicating the terminal device to use the second power allocation information for the downlink data channel only for currently scheduled data transmission; and maintaining the first power allocation information to be used for the downlink data channel for other downlink data transmission than the currently scheduled downlink data transmission; or indicating the second power allocation information for all the downlink data channels to the terminal device, and indicating the terminal device to maintain to use a power corresponding the second power allocation information to receive all downlink data until new power allocation information is received.

2. The method according to claim 1, wherein before the indicating second power allocation information for the downlink data channel to the terminal device in downlink data scheduling information, the method further comprises:

indicating first power allocation information of a downlink data channel to the terminal device through a radio resource control RRC signaling.

3. The method according to claim 1, further comprising:

transmitting the new power allocation information to the terminal device through DCI or RRC reconfiguration information.

4. A power indication method, being applied to a terminal device, and the method comprising:

receiving downlink data scheduling information transmitted from a network side; and acquiring, from the downlink data scheduling information, second power allocation information for a downlink data channel, wherein the acquiring the second power allocation information for the downlink data channel comprises:

in the downlink data scheduling information, acquiring second power allocation information for the downlink data channel only for currently scheduled data transmission, to receive the downlink data channel of the currently scheduled data transmission with a power indicated in the second power allocation information, and maintaining to use a power indicated in the first power allocation information for receiving other downlink data than the currently scheduled downlink data; or in the downlink data scheduling information, acquiring second power allocation information for all the downlink data channels, and using a power corresponding the second power allocation information to receive all downlink data until new power allocation information is received.

5. The method according to claim 4, further comprising: receiving first power allocation information of the downlink data channel indicated from the network side through a radio resource control RRC signaling.

6. The method according to claim 4, further comprising: receiving the new power allocation information transmitted from the network side through DCI or RRC reconfiguration information.

7. A terminal device comprising:

a processor; and a memory configured to store one or more computer programs executable on the processor;

wherein when executing the one or more computer programs, the terminal device is configured to:

receive downlink data scheduling information transmitted from a network side; and acquire second power allocation information for a downlink data channel from the downlink data scheduling information, wherein the terminal device is configured to:

acquire, in the downlink data scheduling information, the second power allocation information for the downlink data channel only for currently scheduled data transmission, receive the downlink data channel of the currently scheduled data transmission with a power indicated in the second power allocation information, and maintain to use a power indicated in the first power allocation information for receiving other downlink data than the currently scheduled downlink data; or acquire, in the downlink data scheduling information, the second power allocation information for all the downlink data channels, and use a power corresponding the second power allocation information to receive all downlink data until new power allocation information is received.

8. The terminal device according to claim 7, wherein the terminal device is further configured to receive first power allocation information of the downlink data channel indicated from the network side through a radio resource control RRC signaling.

9. The terminal device according to claim 7, wherein the terminal device is further configured to receive the new power allocation information transmitted from the network side through DCI or RRC reconfiguration information.

10. A network device, comprising:

a processor; and a memory configured to store one or more computer programs executable on the processor;

wherein when executing the one or more computer programs, the processor is configured to perform the steps of the method according to claim 1.

* * * * *